US012506917B2

(12) United States Patent
Jia et al.

(10) Patent No.: US 12,506,917 B2
(45) Date of Patent: Dec. 23, 2025

(54) VIDEO STREAM TRANSMISSION CONTROL METHOD, AND APPARATUS

(71) Applicant: TENCENT TECHNOLOGY (SHENZHEN) COMPANY LIMITED, Shenzhen (CN)

(72) Inventors: Yuhang Jia, Shenzhen (CN); Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/786,846

(22) Filed: Jul. 29, 2024

(65) Prior Publication Data

US 2024/0388754 A1 Nov. 21, 2024

Related U.S. Application Data

(63) Continuation of application No. PCT/CN2023/100819, filed on Jun. 16, 2023.

(30) Foreign Application Priority Data

Sep. 19, 2022 (CN) .......................... 202211142412.X

(51) Int. Cl.
*H04N 21/2662* (2011.01)
*H04N 21/218* (2011.01)
*H04N 21/845* (2011.01)

(52) U.S. Cl.
CPC ... *H04N 21/2662* (2013.01); *H04N 21/21805* (2013.01); *H04N 21/8456* (2013.01)

(58) Field of Classification Search
CPC ......... H04N 21/2662; H04N 21/21805; H04N 21/8456; H04N 19/597; H04N 21/2343;
(Continued)

(56) References Cited

U.S. PATENT DOCUMENTS

2019/0272618 A1  9/2019  Boyce et al.

FOREIGN PATENT DOCUMENTS

| CN | 107529064 A | 12/2017 |
| CN | 109756540 A | 5/2019 |

(Continued)

OTHER PUBLICATIONS

Katsumata et al; "[32.2][OMAF] OMAF Architecture to Deal with Server-Side Dynamic Adaptation", International Organization for Standardization/ Coding of Moving Pictures and Audio, Jul. 2022, (7 pages).

Katsumata et al; "[OMAF] On Tile-Based Viewport-Dependent Profiles", International Organization for Standardization/ Coding of Moving Pictures and Audio, Apr. 2021, (3 pages).

(Continued)

*Primary Examiner* — Anthony Bantamoi
(74) *Attorney, Agent, or Firm* — Crowell & Moring LLP

(57) ABSTRACT

This discloses relates to a video stream transmission control method and apparatus. A method of a stream pushing terminal includes: obtaining a panoramic video stream; generating, based on the panoramic video stream, video streams respectively corresponding to a plurality of views; encoding the video streams corresponding to the plurality of views into video streams of a plurality of bit rate versions; and distributing, to a plurality of streaming media servers, the video streams of the plurality of bit rate versions respectively corresponding to the plurality of views, to enable a stream pulling terminal to pull, based on a target bit rate version and a target view, a video stream of the target bit rate version corresponding to the target view from a target streaming media server.

18 Claims, 7 Drawing Sheets

(58) Field of Classification Search
CPC ... H04N 21/234345; H04N 21/234363; H04N 21/23439; H04N 21/2402; H04N 21/816; H04N 21/258; H04N 21/4402; H04N 21/466; H04N 21/647
See application file for complete search history.

(56) References Cited

FOREIGN PATENT DOCUMENTS

| | | |
|---|---|---|
| CN | 110519652 A | 11/2019 |
| CN | 112822564 A | 5/2021 |
| CN | 113726759 A | 11/2021 |
| CN | 115022546 A | 9/2022 |
| KR | 10-2021-0141295 A | 11/2021 |

OTHER PUBLICATIONS

WG 03, MPEG Systems; "Technologies under Consideration for OMAF", ", International Organization for Standardization/ Coding of Moving Pictures, Jul. 2022, 5 pages).

Zhang et al; "RAM360: Robust Adaptive Multi-Layer 360° Video Streaming with Lyapunov Optimization", IEEE Transactions on Multimedia, May 2022, (15 pages).

Meyer-Schwickerath; "Analysis of Adaptive Streaming Technologies for Segmented Multimedia Transport of High-Resolution Videos For 360° Playback on Multiple Devices", University of Applied Sciences Hamburg—Master-Thesis, Jun. 2019, (131 pages).

English-language Office Action issued in European Application No. 23867016.0 dated Jun. 17, 2025 (14 pages).

International Search Report with English Translation and Written Opinion, dated Oct. 13, 2023, pp. 1-10, issued in International Application No. PCT/CN2023/100819, China National Intellectual Property Administration, Beijing, China.

VIDEO STREAM TRANSMISSION CONTROL METHOD, AND APPARATUS

RELATED APPLICATION

This application is a continuation application of PCT Patent Application No. PCT/CN2023/100819, filed on Jun. 16, 2023, which claims priority to Chinese Patent Application No. 202211142412. X, filed with the China National Intellectual Property Administration on Sep. 19, 2022 and entitled "VIDEO STREAM TRANSMISSION CONTROL METHOD, APPARATUS, AND SYSTEM, ELECTRONIC DEVICE, AND STORAGE MEDIUM", wherein the content of the above-referenced applications is incorporated herein by reference in its entirety.

FIELD OF THE TECHNOLOGY

This disclosure relates to the field of communication technologies, and in particular, to a video stream transmission control method, a video stream transmission control apparatus, a video stream transmission control system, an electronic device, and a computer-readable storage medium.

BACKGROUND OF THE DISCLOSURE

Currently, video stream transmission may be used in various scenarios such as smart transportation, autonomous driving, a virtual reality (VR) video, a cloud technology, and artificial intelligence. For example, in a virtual reality video scenario, a panoramic video stream needs to be transmitted to a virtual reality playback terminal.

During video stream transmission, a network usually changes, and a network change may affect the video stream transmission to a specific extent. Therefore, how to properly control transmission of the panoramic video stream to adapt to the network change is an urgent problem that needs to be addressed.

SUMMARY

Embodiments of this disclosure respectively provide a video stream transmission control method, a video stream transmission control apparatus, a video stream transmission control system, an electronic device, a computer-readable storage medium, and a computer program product.

According to a first aspect, an embodiment of this disclosure provides a video stream transmission control method, applied to a stream pushing terminal. The method includes: obtaining a panoramic video stream; generating, based on the panoramic video stream, video streams respectively corresponding to a plurality of views; encoding the video streams corresponding to the plurality of views into video streams of a plurality of bit rate versions; and distributing, to a plurality of streaming media servers, the video streams of the plurality of bit rate versions respectively corresponding to the plurality of views, to enable a stream pulling terminal to pull, based on a target bit rate version and a target view, a video stream of the target bit rate version corresponding to the target view from a target streaming media server, the target bit rate version being a bit rate version among the plurality of bit rate versions that matches a predicted network status, and the target view being determined according to required view information.

According to a second aspect, an embodiment of this disclosure provides another video stream transmission control method, applied to a stream pulling terminal. The method includes: receiving a video stream transmitted by a streaming media server; detecting network indicator information of the video stream during receiving the video stream; predicting a network status of the stream pulling terminal based on the network indicator information; obtaining a target bit rate version that matches the network status; determining a target view according to required view information; and generating a stream pulling request based on the target bit rate version and the target view, the stream pulling request being for indicating to pull, from a target streaming media server, a video stream of the target bit rate version corresponding to the target view.

According to a third aspect, an embodiment of this disclosure provides a video stream transmission control apparatus for a stream pushing terminal. The apparatus includes: a memory operable to store computer-readable instructions; and a processor circuitry operable to read the computer-readable instructions. When executing the computer-readable instructions, the processor circuitry is configured to: obtain a panoramic video stream; generate, based on the panoramic video stream, video streams respectively corresponding to a plurality of views; encode the video streams corresponding to the plurality of views into video streams of a plurality of bit rate versions; and distribute, to a plurality of streaming media servers, the video streams of the plurality of bit rate versions respectively corresponding to the plurality of views, to enable a stream pulling terminal to pull, based on a target bit rate version and a target view, a video stream of the target bit rate version corresponding to the target view from a target streaming media server, the target bit rate version being a bit rate version among the plurality of bit rate versions that matches a predicted network status, and the target view being determined according to required view information.

According to a fourth aspect, an embodiment of this disclosure provides a video stream transmission control apparatus for a stream pulling terminal. The apparatus includes: a memory operable to store computer-readable instructions; and a processor circuitry operable to read the computer-readable instructions. When executing the computer-readable instructions, the processor circuitry is configured to: receive a video stream transmitted by a streaming media server; detect network indicator information of the video stream during receiving the video stream; predict a network status of the stream pulling terminal based on the network indicator information; obtain a target bit rate version that matches the network status; determine a target view according to required view information; and generate a stream pulling request based on the target bit rate version and the target view, the stream pulling request being for indicating to pull, from a target streaming media server, a video stream of the target bit rate version corresponding to the target view.

According to a fifth aspect, an embodiment of this disclosure provides a video stream transmission control system, including a stream pushing terminal, a plurality of streaming media servers, and a stream pulling terminal, the stream pushing terminal being configured to obtain a panoramic video stream, generate, based on the panoramic video stream, video streams respectively corresponding to a plurality of views, encode the video streams corresponding to the plurality of views into video streams of a plurality of bit rate versions, and distribute, to the plurality of streaming media servers, the video streams of the plurality of bit rate versions respectively corresponding to the plurality of views; and the stream pulling terminal being configured to determine a matched target bit rate version based on a predicted network status, determine a target view according to required view information, and pull, from a target streaming media server, a video stream of the target bit rate version corresponding to the target view.

According to a sixth aspect, an embodiment of this disclosure provides an electronic device, including: one or more processors; and a memory, configured to store one or more programs, the one or more programs, when executed by the one or more processors, enabling the electronic device to implement the foregoing video stream transmission control method.

According to a seventh aspect, an embodiment of this disclosure provides a non-transitory machine-readable media, having instructions stored on the machine-readable media. When being executed, the instructions are configured to cause a machine to: obtain a panoramic video stream; generate, based on the panoramic video stream, video streams respectively corresponding to a plurality of views; encode the video streams corresponding to the plurality of views into video streams of a plurality of bit rate versions; and distribute, to a plurality of streaming media servers, the video streams of the plurality of bit rate versions respectively corresponding to the plurality of views, to enable a stream pulling terminal to pull, based on a target bit rate version and a target view, a video stream of the target bit rate version corresponding to the target view from a target streaming media server, the target bit rate version being a bit rate version among the plurality of bit rate versions that matches a predicted network status, and the target view being determined according to required view information.

According to an eighth aspect, an embodiment of this disclosure provides a computer program product, including a computer program, the computer program, when executed by a processor, implementing operations of the foregoing video stream transmission control method.

In the technical solutions provided in embodiments of this disclosure, a stream pushing terminal generates, based on a panoramic video stream, video streams respectively corresponding to a plurality of views, encodes the video streams corresponding to the plurality of views into video streams of a plurality of bit rate versions, and distributes, to a plurality of streaming media servers, the video streams of the plurality of bit rate versions respectively corresponding to the plurality of views. A stream pulling terminal determines a matched target bit rate version based on a predicted network status, determines a target view according to required view information, and pulls, from a target streaming media server, a video stream of the target bit rate version corresponding to the target view. In this way, in a panoramic video stream transmission scenario, a process of bit stream selection for different views can adapt to a network change during video stream transmission, thereby achieving proper control of the video stream transmission.

The foregoing general descriptions and the following detailed descriptions are merely for exemplary and explanatory objectives, and cannot limit this disclosure.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with this disclosure. On the contrary, the implementations are merely examples of apparatuses and methods that are described in detail in the appended claims and that are consistent with some aspects of this disclosure.

The block diagrams shown in the accompanying drawings are merely functional entities and do not necessarily correspond to physically independent entities. In other words, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/blocks, and do not need to be performed in the described orders either. For example, some operations/blocks may be further divided, while some operations/blocks may be combined or partially combined. Therefore, an actual execution order may change according to an actual case.

"Plurality of" mentioned in this disclosure means two or more. "And/or" describes an association relationship between associated objects and represents that three relationships may exist. For example, A and/or B may represent the following three cases: only A exists, both A and B exist, and only B exists. The character "/" generally indicates an "or" relationship between associated objects.

Currently, during video stream transmission, a network usually changes, and a network change may affect the video stream transmission to a specific extent. However, in a related art, there is no clear solution on how to properly control transmission of a panoramic video stream to adapt to the network change.

Based on this, embodiments of this disclosure provide a video stream transmission control method, a video stream transmission control apparatus, a video stream transmission control system, an electronic device, a computer-readable storage medium, and a computer program product.

The following describes the embodiments of this disclosure in detail.

Figure 1:
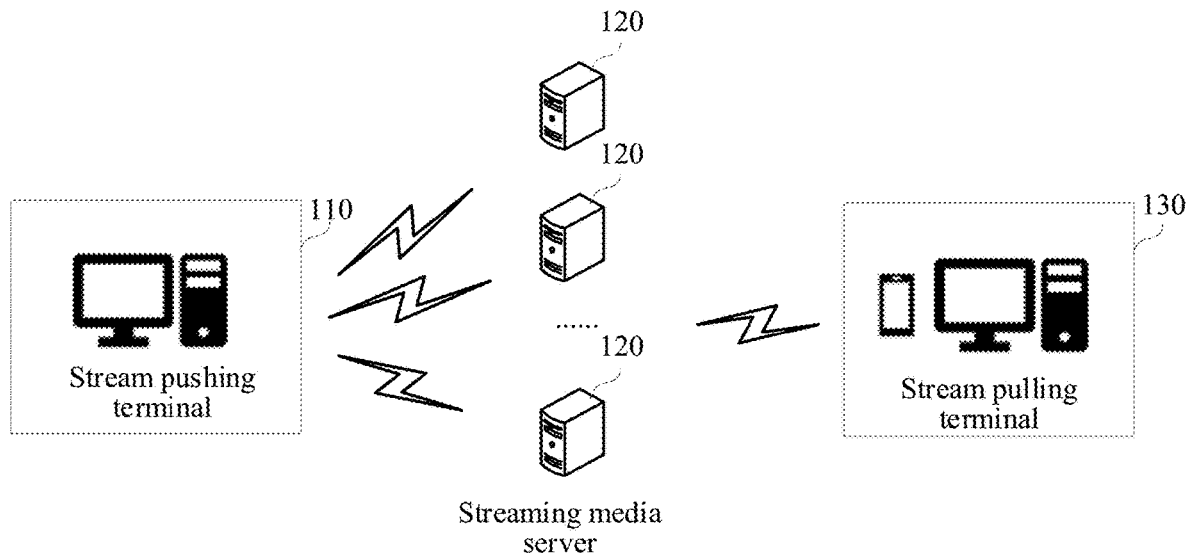
FIG. 1 is a schematic diagram of an implementation environment according to this disclosure.

FIG. 1 is a schematic diagram of an implementation environment according to this disclosure. The implementation environment is an exemplary video stream transmission control system.

As shown in FIG. 1, the exemplary video stream transmission control system includes a stream pushing terminal 110, a plurality of streaming media servers 120, and a stream pulling terminal 130. Communication between the stream pushing terminal 110 and the plurality of streaming media servers 120 and between the stream pulling terminal 130 and the plurality of streaming media servers 120 may be implemented over a wired or wireless network.

The stream pushing terminal 110 includes but is not limited to a terminal device such as a laptop and a computer, or may be a device configured to capture a video or an image, such as a camera, a sensor, a millimeter wave radar, or a laser radar, or may be a server. This is not limited herein.

The streaming media server 120 is a server that transmits media form data of audio, a video, and a multimedia file in a manner of streaming in a network. Transmission in a manner of streaming refers to transmission according to a streaming protocol. The streaming protocol includes but is not limited to a real-time transmission protocol (RTP), a real time streaming protocol (RTSP), a Microsoft media server protocol (MMS), and a real time messaging protocol (RTMP).

The stream pulling terminal 130 includes but is not limited to a smartphone, a tablet, a laptop computer, a computer, a smart interactive device (such as VR glasses and a head-mounted display device), a smart home appliance, an on-board terminal, an aircraft, a server, and the like. This is also not limited herein.

The server mentioned in this implementation environment may be an independent physical server, or a server cluster or distributed system including a plurality of physical servers, or a cloud server providing a cloud service, a cloud database, cloud computing, a cloud function, cloud storage, a network service, cloud communication, a middleware service, a domain name service, a security service, a content delivery network (CDN), big data, an artificial intelligence platform, or the like. This is not limited herein.

A cloud technology is a general term of network technologies, information technologies, integration technologies, management platform technologies, application technologies, and the like, applied based on a cloud computing business model, and may form a resource pool to satisfy what is needed in a flexible and convenient manner. Cloud computing is a computing mode, in which computing tasks are distributed on a resource pool formed by a large quantity of computers, so that various application systems can obtain computing power, storage space, and information services according to requirements. With diversified development of the Internet, a real-time data stream, and a connected device, and demands of a search service, a social network, mobile commerce, and open collaboration, the cloud technology develops rapidly and may be used in more fields. This implementation environment may use the cloud technology to build an environment architecture. For example, the stream pushing terminal 110, the streaming media server 120, and the stream pulling terminal 130 may all provide corresponding cloud services based on cloud computing capabilities. In other words, in this implementation environment, the stream pushing terminal 110, the streaming media server 120, and the stream pulling terminal 130 may all be deployed as cloud servers according to an actual application requirement.

Quantities of the stream pushing terminals 110, the streaming media servers 120, and the stream pulling terminals 130 shown in the implementation environment shown in FIG. 1 are merely examples. In an actual application scenario, any quantity of the stream pushing terminals 110, the streaming media servers 120, and the stream pulling terminals 130 may be set according to an actual application requirement.

In the implementation environment shown in FIG. 1, the stream pushing terminal 110 is configured to obtain a to-be-transmitted panoramic video stream, generate, based on the obtained panoramic video stream, video streams respectively corresponding to a plurality of views, then encode the video streams corresponding to the plurality of views into video streams of a plurality of bit rate versions, and distribute, to the plurality of streaming media servers 120, the video streams of the plurality of bit rate versions respectively corresponding to the plurality of views. The stream pulling terminal 130 is configured to determine, based on a predicted network status, a target bit rate version that matches the network status, determine a target view according to required view information, and pull, from a target streaming media server, a video stream of the target bit rate version corresponding to the target view.

The bit rate version refers to a rate of a bit rate. The target bit rate version is a bit rate version that matches the network status predicted by the stream pulling terminal 130. The target streaming media server is a streaming media server 120 among the plurality of streaming media servers 120 that configured to transmit the video stream of the target bit rate version corresponding to the target view.

According to the foregoing descriptions, the implementation environment shown in FIG. 1 is used in a panoramic video stream transmission scenario, and a process of bit stream selection for different views can adapt to a network change during video stream transmission, thereby achieving proper control of the video stream transmission.

The implementation environment shown in FIG. 1 may be implemented as a plurality of actual application scenarios, including but not limited to a VR video, autonomous driving, and the like.

For example, if used in a VR video scenario, the stream pushing terminal 110 may be a terminal device, such as a laptop computer or a computer, or may be a server, such as a cloud server, and has a function of receiving a panoramic video stream sent by another device, or has a function of storing a panoramic video stream. The stream pulling terminal 130 may be VR glasses, a head-mounted display device, a server or a cloud server that provides a data service for VR glasses or a head-mounted display device, or the like. For example, a computer generates, based on an obtained panoramic video stream, video streams respectively corresponding to a plurality of views, encodes the video streams corresponding to the plurality of views into video streams of a plurality of bit rate versions, and distributes, to the plurality of streaming media servers 120, the video streams of the plurality of bit rate versions respectively corresponding to the plurality of views. VR glasses select, based on their own predicted network status, a target bit rate version that matches the network status, and determine a target view according to their own required view information, to pull, from a target streaming media server, a video stream of the target bit rate version corresponding to the target view. The required view information is generally obtained by the VR glasses. For example, a capture module is disposed in the VR glasses to collect a playback view required in real time by the VR glasses for VR video playback.

For another example, if used in an autonomous driving scenario, the stream pushing terminal 110 may be an on-board camera, a sensor, a millimeter wave radar, a laser radar, or another device configured to capture a video or an image, or may be a server or a cloud server that receives a video stream transmitted by a device configured to capture a video or an image. The stream pulling terminal 130 may be an on-board terminal, a navigation terminal, or a server or a cloud server that provides corresponding data support for an on-board terminal or a navigation terminal, or the like. For example, the on-board camera is configured to collect a panoramic video stream, generate, based on the obtained panoramic video stream, video streams respectively corresponding to a plurality of views, then encode the video streams corresponding to the plurality of views into video streams of a plurality of bit rate versions, and distribute, to the plurality of streaming media servers 120, the video streams of the plurality of bit rate versions respectively corresponding to the plurality of views. The on-board terminal determines, based on its own predicted network status, a target bit rate version that matches the network status, and determines a target view according to required view information, to pull, from a target streaming media server, a video stream of the target bit rate version corresponding to the target view. Because a network status of a vehicle usually fluctuates greatly while the vehicle is driving, the on-board terminal can efficiently obtain a video stream required for autonomous driving by using the video stream of the target bit rate version corresponding to the target view pulled from the target streaming media server. This further ensures safety and reliability of the autonomous driving.

The foregoing VR video and autonomous driving are merely exemplary application scenarios. In an actual VR video application scenario or autonomous driving application scenario, implementation details in the scenario may be adjusted according to an actual need. For example, in the autonomous driving scenario, the on-board camera may be a panoramic camera, or may be a plurality of conventional cameras dispersedly disposed at different locations on a vehicle body. Specific details of the application scenario are not limited herein.

Figure 2:
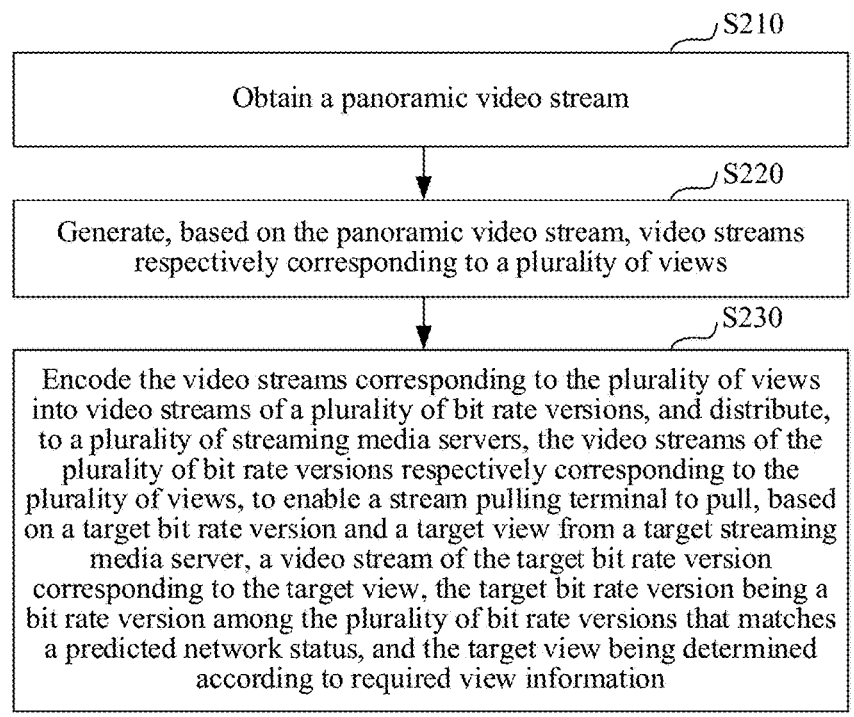
FIG. 2 is a flowchart of a video stream transmission control method according to an exemplary embodiment of this disclosure.

FIG. 2 is a flowchart of a video stream transmission control method according to an exemplary embodiment of this disclosure. The video stream transmission control method is applied to the implementation environment shown in FIG. 1, and is specifically performed by the stream pushing terminal 110 in the implementation environment. Certainly, the video stream transmission control method may also be applied to another implementation environment, and performed by a stream pushing terminal in the another implementation environment. This is not limited in this embodiment.

The stream pushing terminal mentioned in this embodiment, as an entity for performing the video stream transmission control method, refers to a device configured to perform a stream pushing operation. In an actual application scenario, a specific device form of the stream pushing terminal includes but is not limited to the foregoing laptop computer, computer, camera, sensor, millimeter wave radar, laser radar, server or cloud server, and another device. This is not limited herein.

The stream pulling terminal mentioned in this embodiment refers to a device configured to perform a stream pulling operation. In an actual application scenario, a specific device form of the stream pulling terminal includes but is not limited to the foregoing smartphone, tablet, laptop computer, computer, VR glasses, head-mounted display device, on-board terminal, aircraft, server or cloud server, and another device. This is also not limited herein.

As shown in FIG. 2, in an exemplary embodiment, the video stream transmission control method includes S210 to S230.

S210: Obtain a to-be-transmitted panoramic video stream.

The panoramic video stream in this embodiment refers to stream data corresponding to a panoramic video, and may be a panoramic video stream generated in any scenario, including but not limited to a panoramic video stream in the foregoing VR video scenario and autonomous driving scenario.

In a broad sense, the panoramic video refers to a video with a wide field of view obtained by capturing omnidirectionally by a camera or another device configured to collect an image or a video. A capturing angle may be, for example, 360 degrees, 270 degrees, or 180 degrees. This is not limited herein.

In some specific scenarios, such as the VR video scenario, the panoramic video is alternatively referred to as a VR video or a 360° video, and is a video image captured by a panoramic camera composed of a plurality of cameras to simplify production of VR content. For another example, in the autonomous driving scenario, the panoramic video is a combination of video images captured by a plurality of cameras disposed at different locations on a vehicle.

In some implementations, a camera device transmits a collected panoramic video stream to the stream pushing terminal, so that the stream pushing terminal obtains the to-be-transmitted panoramic video stream. For example, the camera device established a wired or wireless communication connection with the stream pushing terminal in advance. When starting capturing, the camera device sends a captured panoramic video stream to the stream pushing terminal.

In some other embodiments, the stream pushing terminal has the panoramic video stream stored thereon. When panoramic video stream transmission needs to be started, the stream pushing terminal correspondingly obtains the video stream locally. For example, a panoramic camera is disposed in the stream pushing terminal. A panoramic video stream captured by the panoramic camera is first stored locally, and then obtained and transmitted by the stream pushing terminal. For another example, the stream pushing terminal is a stream pushing server, and has a large quantity of panoramic video streams stored thereon. When a specific panoramic video stream needs to be transmitted, the panoramic video stream may be obtained locally.

In some other embodiments, the stream pushing terminal may further obtain the video stream from another device, such as obtaining a panoramic video stream from a dedicated video stream storage server. An obtaining manner includes but is not limited to active requesting or passive receiving.

In this embodiment, a manner of how the stream pushing terminal obtains the panoramic video stream may be determined according to an actual scenario requirement. This is not limited in this embodiment.

S220: Generate, based on the panoramic video stream, video streams respectively corresponding to a plurality of views.

Network transmission of the panoramic video stream is directly related to application service quality of the panoramic video. For example, a panoramic video stream with a resolution of 2K×1K requires 4 Mbits/s of transmission data after compression and coding. A panoramic video stream with a resolution of 4K×2K requires 20 Mbits/s of transmission data after compression and coding, and requires at least 25 Mbits/s of network bandwidth to carry the panoramic video stream. Mbits/s is a unit of a transmission rate, and refers to a quantity of bits transmitted per second. Existing Internet bandwidth cannot satisfy transmission of a panoramic video stream with such a high bit rate.

In addition, in an actual application scenario, due to limitations of a video playback device and a view, a user usually only cares about a part of video content within a view range. Therefore, the stream pushing terminal in this embodiment generates, based on the panoramic video stream, video streams respectively corresponding to a plurality of views, and then distributes, to a plurality of streaming media servers, the video streams respectively corresponding to the plurality of views. This avoids transmitting the entire panoramic video stream and supports transmission of a high-resolution video stream even under a limitation of the Internet bandwidth.

S230: Encode the video streams corresponding to the plurality of views into video streams of a plurality of bit rate versions, and distribute, to a plurality of streaming media servers, the video streams of the plurality of bit rate versions respectively corresponding to the plurality of views, to enable a stream pulling terminal to pull from a target streaming media server, based on a target bit rate version and a target view, a video stream of the target bit rate version corresponding to the target view, the target bit rate version being a bit rate version among the plurality of bit rate versions that matches a predicted network status, and the target view being determined according to required view information.

To adapt to a network change during the video stream transmission, the stream pushing terminal compresses and encodes the video streams corresponding to the plurality of views into the video streams of the plurality of bit rate versions. The video streams of the plurality of bit rate versions are also video streams of different bit rates. For example, the video streams corresponding to the plurality of views are compressed and encoded into video streams of three bit rate versions: 2K×1K, 4K×2K, and 8K×4K. A quantity of the bit rate versions and bit rate values corresponding to the bit rate versions are not limited herein. A bit rate represents a quantity of bits transmitted per unit time, and a unit of the bit rate is bit/second (bit/s or bps), kilobit/second (kbit/s or kbps, where k=1000), or megabit/second (Mbps, where M=1000000). A higher bit rate indicates more data that is transmitted per second. A higher resolution of a video image indicates higher image quality, and correspondingly indicates a larger encoded file. On the contrary, a lower bit rate indicates less data that is transmitted per second. A lower resolution of a video image indicates lower image quality, and correspondingly indicates a smaller encoded file.

The stream pushing terminal distributes, to the plurality of streaming media servers, the video streams of the plurality of bit rate versions respectively corresponding to the plurality of views, so that the video streams of the plurality of bit rate versions respectively corresponding to the plurality of views are distributed and transmitted based on the plurality of streaming media servers. In other words, the panoramic video stream is segmented based on different views, and video streams of different bit rate versions in different views are distributed and transmitted by a plurality of streaming media. This supports transmission of video streams in a plurality of views and of a plurality of bit rate versions even under a limitation of the Internet bandwidth.

The network status predicted by the stream pulling terminal refers to predicting a network status of the stream pulling terminal in a future time period according to network indicator information of the stream pulling terminal. In some exemplary implementations, a predicted future time period may be a preset fixed value. For example, the network status of the stream pulling terminal is predicted every five minutes, that is, a network status of the stream pulling terminal in the next five minutes. In some other exemplary implementations, the predicted future time period may alternatively be dynamically changed. A specific network status prediction method is not limited in this embodiment.

The network status may be understood as network quality. When the network quality is good, a video stream with a high bit rate is transmitted to the stream pulling terminal, so that a video playback effect is ensured, and a network resource may not be wasted. When the network quality is poor, a video stream with a low bit rate is transmitted to the stream pulling terminal, so that a problem that causes the stream pulling terminal to be incapable of providing good video playback experience, such as video playback freezing, is not caused. Based on this, in this embodiment, a matched target bit rate version is determined based on the network status of the stream pulling terminal, and an adaptive selection of the bit rate is implemented on the stream pulling terminal. This can ensure maximum utilization of the network resource while ensuring video application experience.

The network indicator information includes, for example, latency information, a jitter value, packet loss rate information, and throughput. The latency information refers to time required for a message or a packet to be transmitted from one end of a network to another end of the network. In this embodiment, the latency information may refer to time required for a message or a packet in the streaming media server to be transmitted to the stream pulling terminal. The jitter value refers to a time difference between a maximum delay and a minimum delay of a network within a time period. The packet loss rate information refers to a rate of a quantity of lost data packets to a quantity of sent data packets in network transmission. The throughput refers to an amount of successfully transmitted data per unit time. These are all indicator information that may reflect the network status of the stream pulling terminal. In an actual application scenario, the network indicator information configured for predicting the network status may be specifically selected according to a need. This is not limited herein. In some other exemplary implementations, the network indicator information includes cell-level network indicator information and user equipment (UE)-level network indicator information.

The required view information is view information actually needed by the stream pulling terminal, so the target view can be determined according to the required view information. Because video streams of different bit rate versions in different views are distributed in the plurality of streaming media servers, the stream pulling terminal pulls from the target streaming media server, based on the target bit rate version and the target view, the video stream of the target bit rate version corresponding to the target view. The target bit rate version is a bit rate version among the plurality of bit rate versions that matches the predicted network status. The target view is determined according to the required view information.

It can be learned from the foregoing descriptions, in the technical solutions provided in this embodiment, a stream pushing terminal generates, based on a panoramic video stream, video streams respectively corresponding to a plurality of views, encodes the video streams corresponding to the plurality of views into video streams of a plurality of bit rate versions, and distributes, to a plurality of streaming media servers, the video streams of the plurality of bit rate versions respectively corresponding to the plurality of views. A stream pulling terminal determines a matched target bit rate version based on a predicted network status, determines a target view according to required view information, and pulls, from a target streaming media server, a video stream of the target bit rate version corresponding to the target view. In this way, in a panoramic video stream transmission scenario, a process of bit stream selection for different views can adapt to a network change during video stream transmission, thereby achieving proper control of the video stream transmission.

In addition, in another exemplary embodiment, the video stream transmission control method further includes S310 after S210: Start a data packet clock synchronization service, to maintain data packet clock synchronization between the stream pushing terminal, the plurality of streaming media servers, and the stream pulling terminal. The data packet clock synchronization between the stream pushing terminal, the plurality of streaming media servers, and the stream pulling terminal is maintained, so that an error of the network indicator information configured for predicting the network status of the stream pulling terminal is small, or there is no significant error, so that the predicted network status is accurate. This further affects a subsequent process of accurately selecting the video stream of the target bit rate version.

Figure 3:
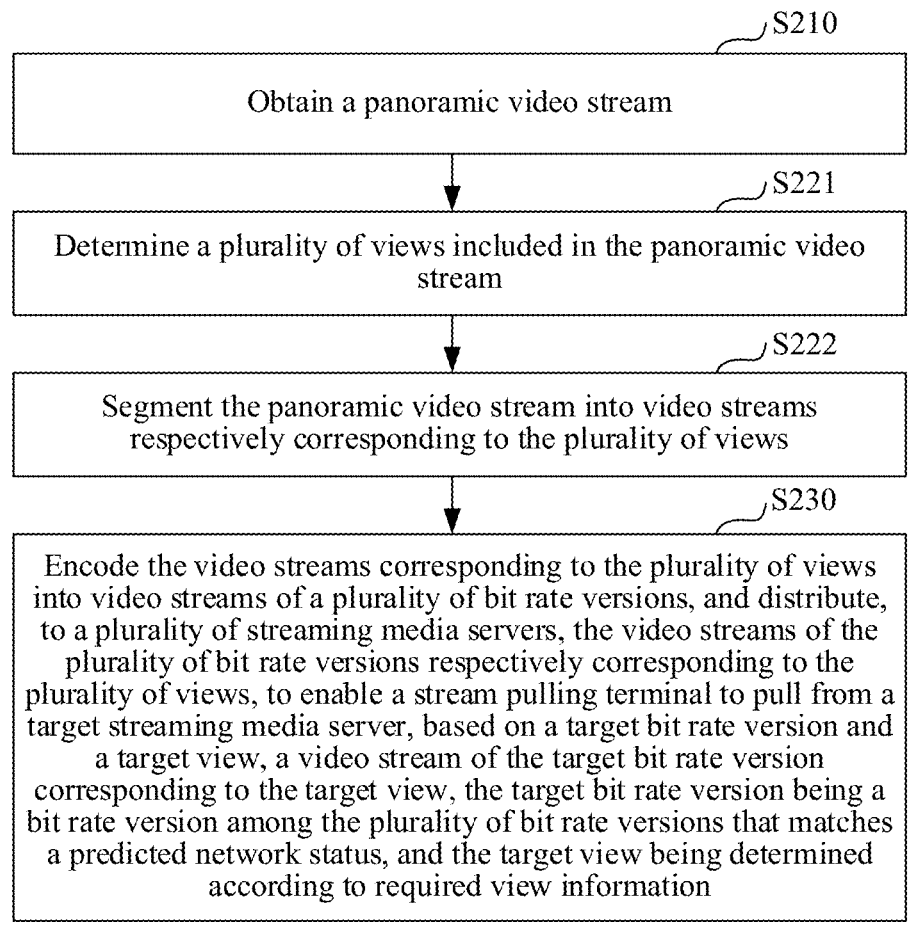
FIG. 3 is a flowchart of a video stream transmission control method according to another exemplary embodiment of this disclosure.

FIG. 3 is a flowchart of a video stream transmission control method according to another exemplary embodiment of this disclosure. As shown in FIG. 3, the exemplary video stream transmission control method is based on the embodiment shown in FIG. 2. S220 further includes the following S221 and S222.

S221: Determine a plurality of views included in the panoramic video stream.

S222: Segment the panoramic video stream into the video streams respectively corresponding to the plurality of views.

The panoramic video stream is obtained by combining videos collected by a plurality of cameras into one video stream. Therefore, the plurality of views may be determined from the panoramic video stream. The panoramic video stream is segmented based on the plurality of determined views, to obtain the video streams respectively corresponding to the plurality of views.

For example, in an exemplary implementation, planar mapping is performed on the panoramic video stream to determine, based on a plurality of geometric faces obtained by mapping, the plurality of views included in the panoramic video stream. Then the panoramic video stream is segmented based on the plurality of determined views, to obtain the video streams respectively corresponding to the plurality of views.

Performing the planar mapping on the panoramic video stream refers to unfolding and mapping a video image corresponding to the panoramic video stream onto a plane. A mapping mode includes polyhedral mapping, rectangular mapping, and the like. The polyhedral mapping includes, for example, cube mapping, octahedral mapping, and icosahedral mapping. This is not limited herein. Selection may be made according to an actual need in an actual application scenario. For example, view data may be determined according to an actual network environment, and then a specific mode may be selected to perform the planar mapping on the panoramic video stream.

Figure 4:
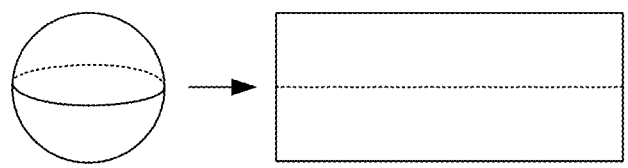
FIG. 4 is a schematic diagram of an effect of segmenting a panoramic video stream into video streams respectively corresponding to two views in a manner of rectangular mapping.
Figure 5:
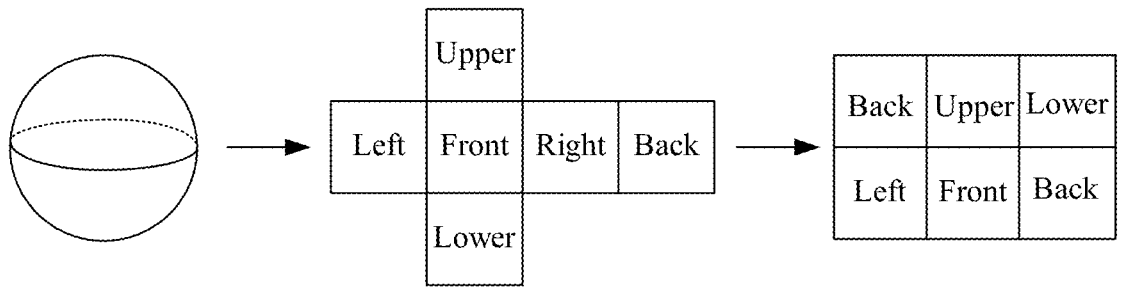
FIG. 5 is a schematic diagram of an effect of segmenting a panoramic video stream into video streams respectively corresponding to six views in a manner of cube mapping.

The rectangular mapping refers to sampling content of the panoramic video stream in a dimension of a sphere according to a sampling frequency of the equator and representing the content on a plane. For example, as shown in FIG. 4, video images corresponding to two rectangular faces can be obtained in a manner of the rectangular mapping, so that the panoramic video stream can be segmented into video streams corresponding to two views. The cube mapping refers to projecting spherical content onto six faces of a cube, and then splicing and reorganizing the six faces into a complete video. For example, as shown in FIG. 5, video images corresponding to six faces of upper, lower, left, right, front, and back can be obtained in a manner of the cube mapping, and these six faces are recombined to form a two-dimensional planar video image, and each face is used as a view, so that the panoramic video stream can be segmented into video streams corresponding to six views. Polyhedral mapping such as the octahedral mapping and the icosahedral mapping is similar to the cube mapping. Details refer to the embodiments described herein.

Figure 6:
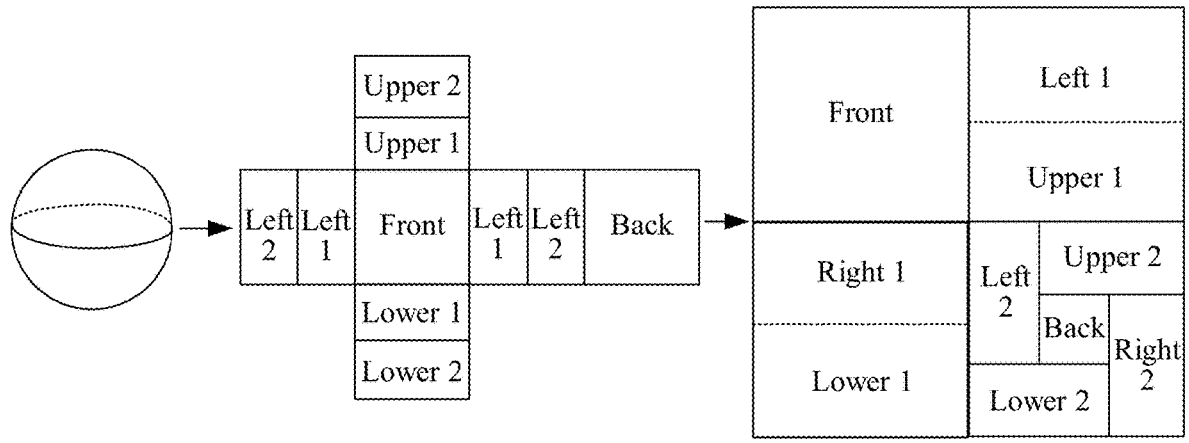
FIG. 6 is a schematic diagram of an effect of segmenting a panoramic video stream into video streams respectively corresponding to six views in a manner of multi-resolution polyhedral mapping.

In addition, there is also multi-resolution polyhedral mapping, which is obtained by transforming the polyhedral mapping. For example, as shown in FIG. 6, based on the cube mapping, resolution of the front and half of the adjacent upper, lower, left, and right faces may be kept unchanged, in other words, resolution of upper 1, lower 1, left 1, and right 1 may be kept unchanged. Video content of the remaining half of four faces, that is, upper 2, lower 2, left 2, and right 2, and remaining faces are down-sampled, and finally recombined to form a two-dimensional planar video image. Based on this, the panoramic video stream may alternatively be segmented into video streams corresponding to six views, and a video stream corresponding to each view is not uniformly mapped.

In another exemplary implementation, it is considered that the panoramic video stream may not necessarily be collected by a panoramic camera, but may also be obtained by combining videos respectively collected by a plurality of cameras. For example, a panoramic video stream in an autonomous driving scenario is obtained by combining videos collected by cameras disposed at different locations on a vehicle. Therefore, each camera may be used as a view, and a plurality of views included in the panoramic video stream may be determined based on a quantity of the cameras. Then, the panoramic video stream is segmented, according to a reverse process of video stream splicing, into video streams correspondingly collected by the cameras, to obtain the video streams respectively corresponding to the plurality of views.

It can be learned from the foregoing descriptions, in this embodiment, a panoramic video stream is segmented into video streams respectively corresponding to a plurality of views, and the video streams of a plurality of bit rate versions respectively corresponding to the plurality of views are distributed to a plurality of streaming media servers, to enable a stream pulling terminal to pull, from a target streaming media server, a video stream of a target bit rate version corresponding to a target view. This facilitates subsequent coding, output, and the like of the video stream.

Figure 7:
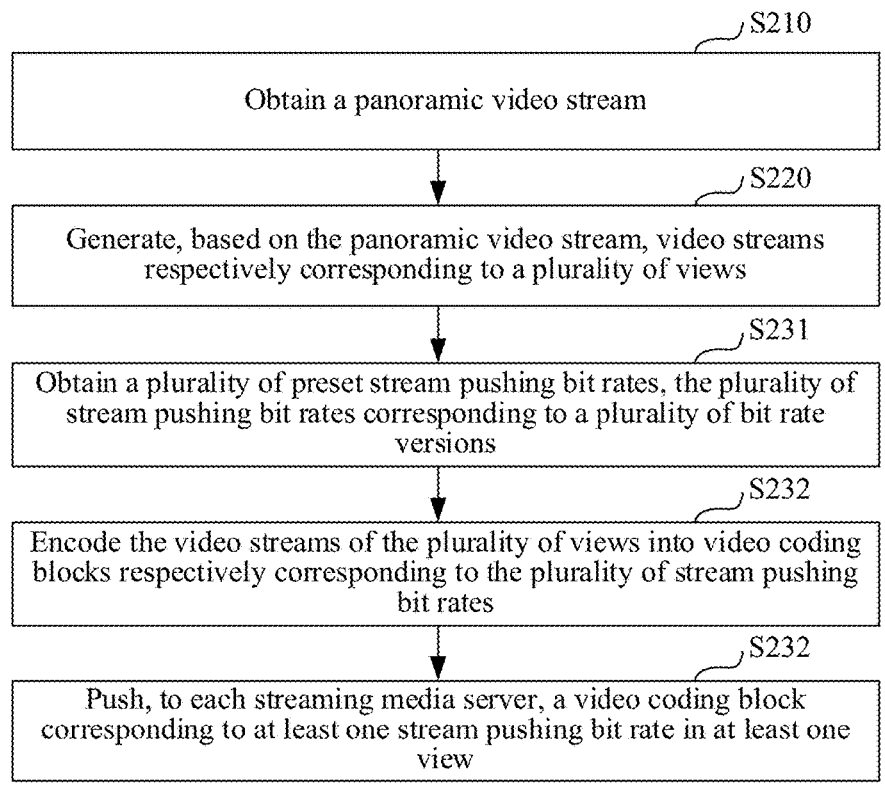
FIG. 7 is a flowchart of a video stream transmission control method according to another exemplary embodiment of this disclosure.

FIG. 7 is a flowchart of a video stream transmission control method according to another exemplary embodiment of this disclosure. As shown in FIG. 7, the exemplary video stream transmission control method is also provided based on the embodiment shown in FIG. 2. Specifically, S230 may further include S231 to S233.

S231: Obtain a plurality of preset stream pushing bit rates, the plurality of stream pushing bit rates corresponding to the plurality of bit rate versions.

A stream pushing terminal in this embodiment performs stream pushing processing on a panoramic video stream based on the preset stream pushing bit rates. There are a plurality of preset stream pushing bit rates in this embodiment, and the plurality of stream pushing bit rates correspond to the plurality of bit rate versions.

S232: Encode the video streams of a plurality of views into video coding blocks respectively corresponding to the plurality of stream pushing bit rates.

The stream pushing terminal encodes the video streams of the plurality of views into the video coding blocks corresponding to the plurality of stream pushing bit rates, to obtain video streams of the plurality of bit rate versions respectively corresponding to the plurality of views.

For example, if the panoramic video stream is segmented in view, a plurality of obtained views are a1, a2, and a3, and a plurality of preset stream pushing bit rates are b1, b2, and b3, video streams corresponding to the view a1 may be respectively encoded into a video coding block A1 corresponding to the stream pushing bit rate b1, a video coding block A2 corresponding to the stream pushing bit rate b2, and a video coding block A3 corresponding to the stream pushing bit rate b3. Video streams corresponding to the view a2 are respectively encoded into a video coding block B1 corresponding to the stream pushing bit rate b1, a video coding block B2 corresponding to the stream pushing bit rate b2, and a video coding block B3 corresponding to the stream pushing bit rate b3. Video streams corresponding to the view a3 are respectively encoded into a video coding block C1 corresponding to the stream pushing bit rate b1, a video coding block C2 corresponding to the stream pushing bit rate b2, and a video coding block C3 corresponding to the stream pushing bit rate b3.

S233: Push, to each streaming media server, a video coding block corresponding to at least one stream pushing bit rate in at least one view.

In this embodiment, to distribute, to a plurality of streaming media servers, the video streams of the plurality of bit rate versions corresponding to the plurality of views, a manner of pushing, to each streaming media server, a video coding block corresponding to at least one stream pushing bit rate in at least one view is used. In other words, each streaming media server may be configured to transmit a video stream of at least one bit rate version in at least one view. In this way, the video streams of the plurality of bit rate versions corresponding to the plurality of views are distributed and transmitted.

For example, in an exemplary implementation, at least one view corresponding to each streaming media server may be determined, and then video coding blocks corresponding to a plurality of stream pushing bit rates in corresponding views are pushed to streaming media servers. In other words, in this implementation, the plurality of streaming media servers are allocated based on different views to implement distribution of video streams in a plurality of views and of a plurality of bit rate versions.

For example, if the foregoing example in which the panoramic video stream is segmented in view, a plurality of obtained views are a1, a2, and a3, and the plurality of preset stream pushing bit rates are b1, b2, and b3 is still used, streaming media servers n1, n2, and n3 configured to transmit video streams may be determined. The video coding blocks A1, A2, and A3 corresponding to the view a1 are all pushed to the streaming media server n1, the video coding blocks B1, B2, and B3 corresponding to the view a2 are all pushed to the streaming media server n2, and the video coding blocks C1, C2, and C3 corresponding to the view a3 are all pushed to the streaming media server n3.

When a streaming media server has good performance, the streaming media server may also be configured to transmit video coding blocks of a plurality of bit rate versions in two or more views. For example, the video coding blocks A1, A2, and A3 corresponding to the view a1 and the video coding blocks B1, B2, and B3 corresponding to the view a2 are all pushed to the streaming media server n1. This may be specifically set according to an actual application requirement, and is not limited herein.

In another exemplary implementation, at least one stream pushing bit rate corresponding to each streaming media server may be determined, and then video coding blocks corresponding to the plurality of views of corresponding stream pushing bit rates are pushed to streaming media servers. In other words, in this implementation, the plurality of streaming media servers are allocated based on different bit rate versions to implement the distribution of video streams in a plurality of views and of a plurality of bit rate versions.

For example, in the foregoing example, it may be determined that the streaming media server n1 corresponds to the stream pushing bit rate b1, the streaming media server n2 corresponds to the stream pushing bit rate b2, and the streaming media server n3 corresponds to the stream pushing bit rate b3. Therefore, the video coding block A1 corresponding to the view a1, the video coding block B1 corresponding to the view a2, and the video coding block C1 corresponding to the view a3 are all pushed to the streaming media server n1, the video coding block A2 corresponding to the view a1, the video coding block B2 corresponding to the view a2, and the video coding block C2 corresponding to the view a3 are all pushed to the streaming media server n2, and the video coding block A3 corresponding to the view a1, the video coding block B3 corresponding to the view a2, and the video coding block C3 corresponding to the view a3 are all pushed to the streaming media server n3.

When a streaming media server has good performance, the streaming media server may also be configured to transmit full view video coding blocks of two or more bit rate versions. For example, the video coding blocks A1 and A2 corresponding to the view a1, the video coding blocks B1 and B2 corresponding to the view a2, and the video coding blocks C1 and C2 corresponding to the view a3 are all pushed to the streaming media server n1. This is also not limited herein.

Certainly, it is not limited to the foregoing two manners of allocating the plurality of streaming media servers based on different views or bit rate versions. In an actual application scenario, the plurality of streaming media servers may also be allocated arbitrarily, or may be allocated by a combination of these two manners, so that distribution and transmission of video streams in a plurality of views and of a plurality of bit rate versions can be implemented during a transmission process of the panoramic video stream for a stream pulling terminal. This may not waste network resources, and also satisfies an actual need of the stream pulling terminal for the video stream bit rate version, and ensures good video stream transmission experience.

Figure 8:
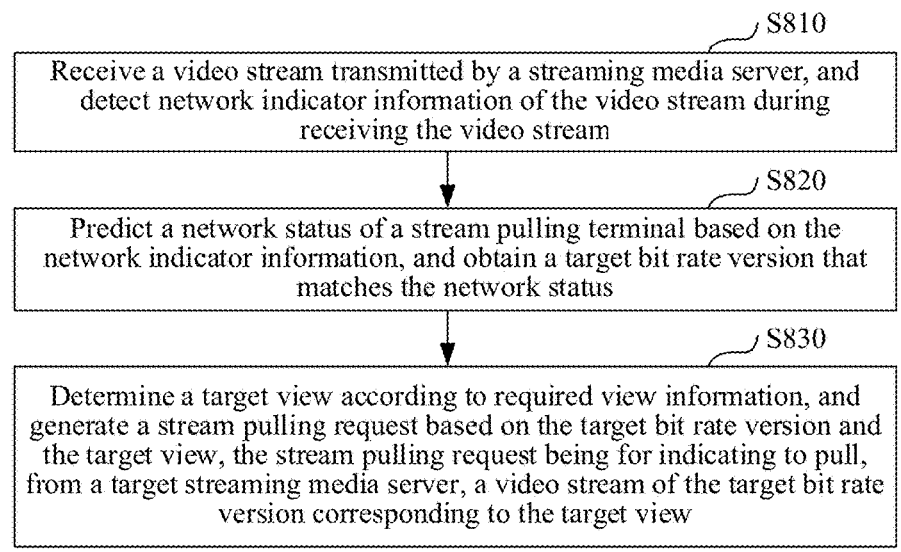
FIG. 8 is a flowchart of a video stream transmission control method according to another exemplary embodiment of this disclosure.

FIG. 8 is a flowchart of a video stream transmission control method according to another exemplary embodiment of this disclosure. The video stream transmission control method is also applied to the implementation environment shown in FIG. 1, and is specifically performed by the stream pulling terminal 130 in the implementation environment. Certainly, the video stream transmission control method may also be applied to another implementation environment, and performed by a stream pulling terminal in the another implementation environment. This is also not limited in this embodiment.

The stream pulling terminal mentioned in this embodiment, as an entity for performing the video stream transmission control method, refers to a device configured to perform a stream pulling operation. A specific device form of the stream pulling terminal includes but is not limited to the foregoing smartphone, tablet, laptop computer, computer, VR glasses, head-mounted display device, on-board terminal, aircraft, server or cloud server, and another device. This is not limited herein.

As shown in FIG. 8, in an exemplary embodiment, the video stream transmission control method includes the following S810 to S830.

S810: Receive a video stream transmitted by a streaming media server, and detect network indicator information of the video stream during a receiving process.

In this embodiment, at an early stage of video stream transmission, one of a plurality of streaming media servers may be preset to transmit a video stream of a specified bit rate version in a default view to the stream pulling terminal, and then network indicator information during a receiving process is detected during the stream pulling terminal receiving the video stream transmitted by the streaming media server.

Alternatively, in another implementation, a specific streaming media server may also be preset to transmit a preset video stream to the stream pulling terminal. To be specific, at the early stage of the video stream transmission, the network indicator information is detected by the stream pulling terminal during receiving the preset video stream. This is not limited herein.

According to the foregoing descriptions, the network indicator information includes, for example, latency information, a jitter value, packet loss rate information, and throughput. This is also not limited herein.

For some network indicator information, a greater value of the network indicator information indicates worse network quality. On the contrary, a less value of the network indicator information indicates better network quality. For example, for the latency information, 100 ms>10 ms, and network quality represented by 100 ms is worse than network quality represented by 10 ms. For some network indicator information, a greater value of the network indicator information indicates better network quality. On the contrary, a less value of the network indicator information indicates worse network quality. For example, for a transmission bit rate, 10 Mbps>5 Mbps, and network quality represented by 10 Mbps is better than network quality represented by 5 Mbps.

S820: Predict a network status of the stream pulling terminal based on the network indicator information, and obtain a target bit rate version that matches the network status.

The network status represents quality of a video stream transmission network. Therefore, in this embodiment, quality of a network environment in which the stream pulling terminal is located can be determined based on the network indicator information, and then a bit rate version that matches the quality of the network environment is determined.

The quality of the network environment in which the stream pulling terminal is located is in a positive correlation with the bit rate version. Specifically, in an actual application scenario, for example, when the stream pulling terminal is implemented as VR glasses for VR video playback, a user always expects that quality of a watched VR video is high and a viewing process is smooth. Therefore, if the quality of the network environment in which the stream pulling terminal is located is high, the stream pulling terminal can pull a video stream of a high bit rate version, to satisfy a need of the user. When the quality of the network environment in which the stream pulling terminal is located is low, it is more conducive for the user to obtain better experience by reducing the playback quality of the VR video to ensure smoothness of the VR video playback, so that the stream pulling terminal pulls a video stream of a low bit rate version.

For example, the quality of the network environment in which the stream pulling terminal is located can be determined based on a relationship between the value of the network indicator information and a preset indicator threshold.

For example, if the value of the network indicator information is greater than or equal to the preset indicator threshold, it is determined that the network environment in which the stream pulling terminal is located is of first level quality. If the value of the network indicator information is less than the preset indicator threshold, it is determined that the network environment in which the stream pulling terminal is located is of second level quality. The network environment of the first level quality is better than the network environment of the second level quality.

If there are a plurality of pieces of network indicator information, relationships between a plurality of values of the network indicator information and the preset indicator threshold are detected separately to obtain a first detection result. If the first detection result indicates that there are a specified quantity of values among the plurality of values that are greater than the preset indicator threshold, it is determined that the network environment in which the stream pulling terminal is located is of the first level quality. If the first detection result indicates that there are no specified quantity of values among the plurality of values that are greater than the preset indicator threshold, it is determined that the network environment in which the stream pulling terminal is located is of the second level quality. The first level quality is higher than the second level quality.

For example, if it is assumed that a plurality of detected values of the network indicator information are $m1$, $m2$, $m3$, and $m4$ respectively, and the preset indicator threshold is $m0$, $m1$, $m2$, $m3$, and $m4$ are compared with $m0$ separately to obtain the first detection result. In addition, it is assumed that $m1>m0$, $m2>m0$, $m3>m0$, and $m4<m0$ in the first detection result, and the specified quantity is two. In this case, the first detection result indicates that there are a specified quantity of values among the plurality of values that are greater than the preset indicator threshold, and it can be determined that the network environment in which the stream pulling terminal is located is of the first level quality. Alternatively, it is assumed that m1<m0, m2<m0, m3>m0, and m4<m0 in the first detection result, and the specified quantity is two. In this case, the first detection result indicates that there are no specified quantity of values among the plurality of values that are greater than the preset indicator threshold, and it can be determined that the network environment in which the stream pulling terminal is located is of the second level quality. In this way, accuracy of determining the quality of the network environment in which the stream pulling terminal is located can be improved based on the plurality of values of the network indicator information, so that accuracy of determining the target bit rate version can be improved.

In another exemplary implementation, to more accurately determine the quality of the network environment in which the stream pulling terminal is located, the stream pulling terminal detects a plurality of values of the same network indicator information within a preset time period during the receiving process of the video stream. Average or weighted average calculation may be performed on the plurality of values of the same network indicator information, and an obtained calculation result may be used as a value corresponding to the network indicator information. Subsequently, based on a comparison result between values corresponding to different network indicator information and the preset indicator threshold, the quality of the network environment in which the stream pulling terminal is located is determined, and the bit rate version that matches the quality of the network environment is determined. For example, if it is assumed that a plurality of detected values of specific network indicator information within a time period are e1, e2, e3, and e4, an average value e'=(e1+2+3+e4)/4 is obtained. The preset indicator threshold is set to e0, and e' is compared with e0.

In this embodiment, the stream pulling terminal determines the quality of the network environment in which the stream pulling terminal is located based on the relationship between the value of the network indicator information and the preset indicator threshold, and a stream pulling bit rate that matches the quality of the network environment can be quickly and accurately determined based on the quality of the network environment. An implementation process is simple and may be applied to a plurality of application scenarios.

In another exemplary embodiment, an artificial intelligence technical means may also be used to predict the network status of the stream pulling terminal based on the network indicator information. For example, an artificial intelligence model that uses network indicator information as an input signal and a network status as an output signal may be built in advance to predict a corresponding network status for the input signal. The artificial intelligence model may be, for example, a decision tree algorithm, or a machine learning model, such as a machine learning model for classification prediction, which may be selected according to an actual need. A specific structure of the artificial intelligence model is not limited herein.

S830: Determine a target view according to required view information, and generate a stream pulling request based on the target bit rate version and the target view, the stream pulling request being configured for indicating to pull, from a target streaming media server, a video stream of the target bit rate version corresponding to the target view.

According to the foregoing descriptions, the required view information is a view that the stream pulling terminal needs to obtain, so that the target view can be determined based on the required view information. For example, in a VR video playback scenario, VR glasses may capture head rotation information of a user to determine the required view information. For another example, in an autonomous driving scenario, a required view is usually preset, so the required view information may be obtained directly. When preset required view information is updated, the preset required view information may also be obtained correspondingly.

The stream pulling terminal generates the stream pulling request based on the target bit rate version and the target view, to pull from the target streaming media server, based on the stream pulling request, the video stream of the target bit rate version corresponding to the target view. For example, if video streams in a plurality of views and of a plurality of bit rate versions are distributed to the plurality of streaming media servers based on different views, the stream pulling terminal determines the target streaming media server based on the target view, and then pulls the video stream of the target bit rate version from the target streaming media server. If the video streams in a plurality of views and of a plurality of bit rate versions are distributed to the plurality of streaming media servers based on different bit rate versions, the stream pulling terminal determines the target streaming media server based on the target bit rate version, and then pulls, from the target streaming media server, the video stream corresponding to the target view. If the video streams in a plurality of views and of a plurality of bit rate versions are arbitrarily distributed to the plurality of streaming media servers, each streaming media server may be configured to record information about a view and a bit rate version of a stream that the streaming media server receives. The information about the view and the bit rate version recorded by each streaming media server is queried to determine the target streaming media server for transmitting the video stream of the target bit rate version in the target view, and the corresponding video stream is pulled.

It can be learned from the foregoing descriptions, a stream pushing terminal distributes video streams of a plurality of bit rate versions respectively corresponding to a plurality of views to the plurality of streaming media servers. A stream pulling terminal determines a matched target bit rate version based on a predicted network status, determines a target view according to required view information, and pulls, from a target streaming media server, a video stream of the target bit rate version corresponding to the target view. In this way, in a panoramic video stream transmission scenario, a process of bit stream selection for different views can adapt to a network change during video stream transmission, thereby achieving proper control of the video stream transmission.

In another exemplary embodiment, the stream pulling terminal establishes communication connections with the plurality of streaming media servers based on a stream pulling server. In other words, the plurality of streaming media servers transmit video streams to the stream pulling terminal by using the stream pulling server. The stream pulling terminal transmits the stream pulling request to the stream pulling server, to enable the stream pulling server to pull, from the target streaming media server, the video stream of the target bit rate version corresponding to the target view, and return the pulled video stream to the stream pulling terminal.

Figure 9:
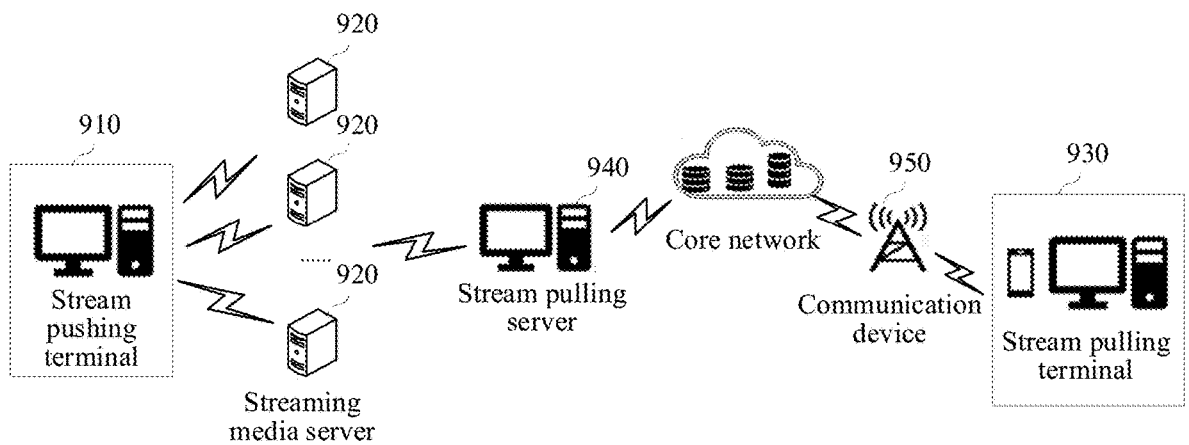
FIG. 9 is a schematic diagram of a video stream transmission control system according to an exemplary embodiment of this disclosure.

Correspondingly, in another exemplary video stream transmission control system as shown in FIG. 9, in addition to a stream pushing terminal 910, a plurality of streaming media servers 920, and a stream pulling terminal 930, a stream pulling server 940 is also included. The stream pulling terminal 930 communicates with the plurality of streaming media servers 920 based on the stream pulling server 940.

The stream pushing terminal 910 is configured to obtain a panoramic video stream, generate, based on the panoramic video stream, video streams respectively corresponding to a plurality of views, and encode the video streams corresponding to the plurality of views into video streams of a plurality of bit rate versions, to distribute, to the plurality of streaming media servers 920, the encoded video streams of the plurality of bit rate versions respectively corresponding to the plurality of views.

The stream pulling terminal 930 is configured to determine a matched target bit rate version based on a predicted network status, and determine a target view according to required view information, to generate a stream pulling request based on the target bit rate version and the target view, and transmit the stream pulling request to the stream pulling server 940.

The stream pulling server 940 is configured to pull, from a target streaming media server, a video stream of the target bit rate version corresponding to the target view after receiving the stream pulling request transmitted by the stream pulling terminal.

For detailed functions of each device in the video stream transmission control system shown in FIG. 9, refer to the detailed records in the foregoing embodiments. In addition, the stream pulling server 940 may be an independent physical server, or may be a server cluster or a distributed system including a plurality of physical servers, or may be a cloud server that provides a basic cloud computing service. This is also not limited in this embodiment. In an exemplary implementation, the stream pulling server 940 is specifically a motion monitoring server. The motion monitoring server refers to a server having a motion monitoring function. In a scenario such as a VR video, the required view information in the stream pulling terminal 930 usually changes dynamically. For example, when the stream pulling terminal 930 is VR glasses or a VR server, the required view information in the stream pulling terminal 930 changes with an actual view captured by the VR glasses. Therefore, the stream pulling server 940 may also pull a video stream correspondingly as the required view information in the stream pulling terminal 930 changes, thereby achieving the motion monitoring function.

In addition, in an exemplary implementation, the video stream transmission control system further includes a communication device 950 as shown in FIG. 9. The communication device 950 is, for example, a base station. The stream pulling terminal 930 establishes a communication connection with the stream pulling server 940 based on the communication device 950. Data transmission is performed between the communication device 950 and the stream pulling server 940 over a core network.

A mobile network may be divided into three major parts: an access network, a bearer network, and a core network. The access network is responsible for receiving data, the bearer network is responsible for transmitting the data, and the core network is responsible for managing the data. The essence of the core network is processing and distribution of data. In this embodiment, the core network includes but is not limited to a 4G core network, a 5G core network, and the like. This is not limited herein.

Figure 10:
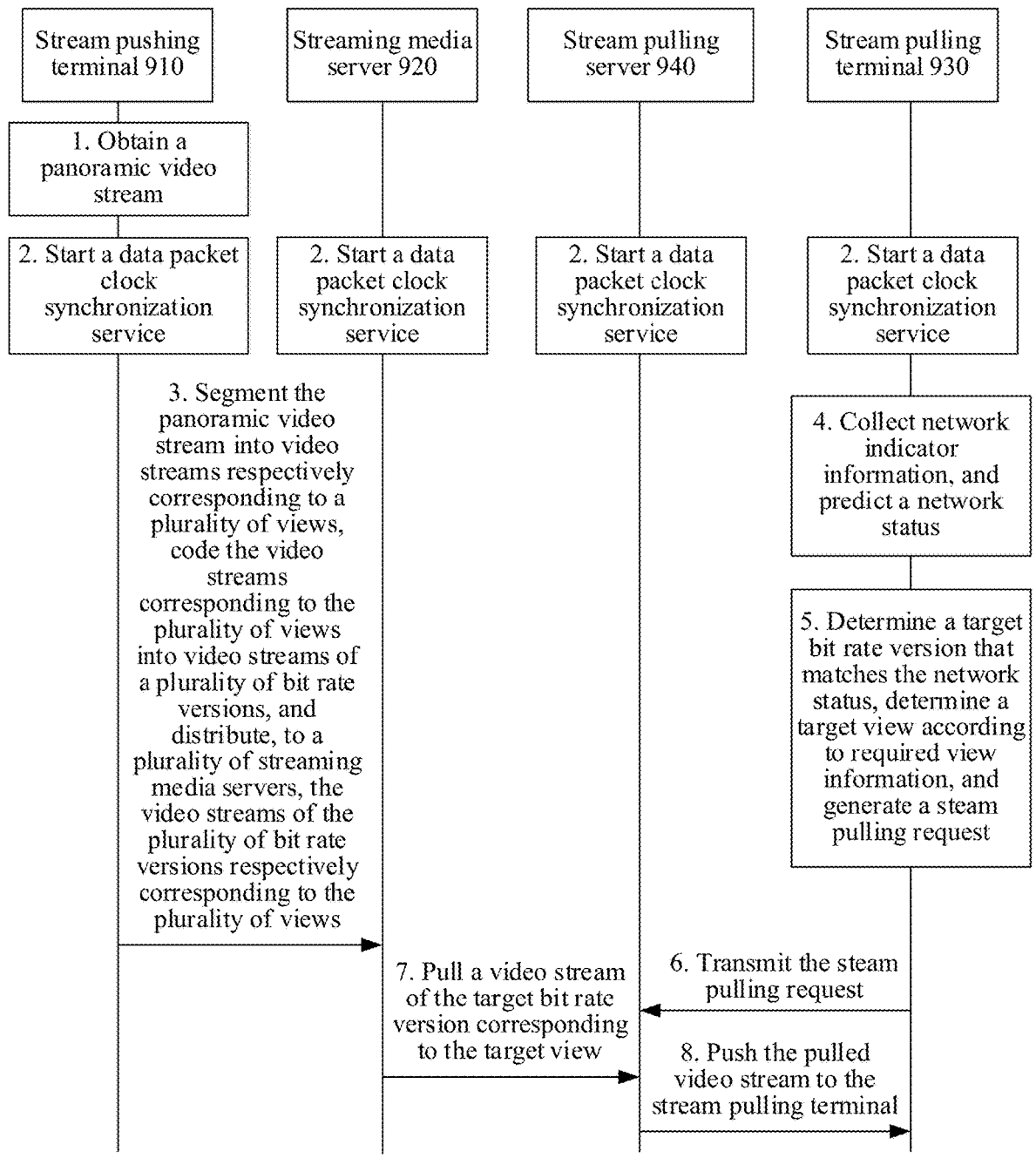
FIG. 10 is a schematic diagram of a transmission process of a panoramic video stream provided based on the video stream transmission control system shown in FIG. 9.

FIG. 10 is a schematic diagram of a transmission process of a panoramic video stream provided based on the video stream transmission control system shown in FIG. 9.

As shown in FIG. 10, after the stream pushing terminal 910 obtains the panoramic video stream, the stream pushing terminal 910, the streaming media server 920, the stream pulling terminal 930, and the stream pulling server 940 each start a data packet clock synchronization service. The stream pushing terminal 910 continues to perform multi-view segmentation processing and multi-bit rate version coding processing on the panoramic video stream, to obtain video streams of a plurality of bit rate versions corresponding to a plurality of views, and then distributes, to the plurality of streaming media servers 920, the video streams of the plurality of bit rate versions corresponding to the plurality of views.

The stream pulling terminal 930 collects network indicator information and predicts a network status, then determines a matched target bit rate version based on the predicted network status, determines a target view based on required view information, generates a stream pulling request based on the target bit rate version and the target view, and then transmits the stream pulling request to the stream pulling server 940, thereby uploading a selection result of the bit rate version together with the required view information of the stream pulling terminal 930 to the stream pulling server 940. The stream pulling server 940 determines a target streaming media server from the plurality of streaming media servers 920 in response to the stream pulling request, pulls, from the target streaming media server, a video stream of the target bit rate version corresponding to the target view, and pushes the pulled video stream to the stream pulling terminal 930.

Based on the foregoing process, a process of selecting bit rate versions for different views in panoramic video streaming transmission can be implemented, and for different views, the selected bit rate versions are all adapted to a network change. Therefore, in the video stream transmission control method provided in embodiments of this disclosure, proper control of video streams for different views during the panoramic video stream transmission is achieved.

Figure 11:
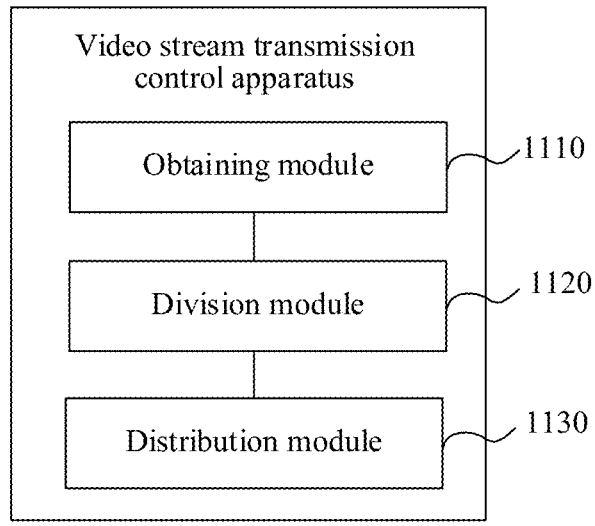
FIG. 11 is a block diagram of a video stream transmission control apparatus according to an exemplary embodiment of this disclosure.

FIG. 11 is a block diagram of a video stream transmission control apparatus according to an exemplary embodiment of this disclosure. The apparatus is applied to the implementation environment shown in FIG. 1, and is specifically configured on the stream pushing terminal 110 in the implementation environment shown in FIG. 1. The apparatus is also applied to the video stream transmission control system shown in FIG. 9, and is specifically configured on the stream pushing terminal 910 in the video stream transmission control system shown in FIG. 9.

As shown in FIG. 11, the exemplary video stream transmission control apparatus includes:

an obtaining module 1110, configured to obtain a panoramic video stream; a division module 1120, configured to generate, based on the panoramic video stream, video streams respectively corresponding to a plurality of views; and a distribution module 1130, configured to encode the video streams corresponding to the plurality of views into video streams of a plurality of bit rate versions, and distribute, to a plurality of streaming media servers, the video streams of the plurality of bit rate versions respectively corresponding to the plurality of views, to enable a stream pulling terminal to pull from a target streaming media server, based on a target bit rate version and a target view, a video stream of the target bit rate version corresponding to the target view, the target bit rate version being a bit rate version among the plurality of bit rate versions that matches a predicted network status, and the target view being determined according to required view information.

Here, the term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

In another exemplary embodiment, the division module 1120 includes:

a determining unit, configured to determine a plurality of views included in the panoramic video stream; and a division unit, configured to segment the panoramic video stream into the video streams respectively corresponding to the plurality of views.

In another exemplary embodiment, the determining unit is configured to perform planar mapping on the panoramic video stream, and determine, based on a plurality of geometric faces obtained by mapping, the plurality of views included in the panoramic video stream. The division unit is configured to segment the panoramic video stream based on the plurality of determined views, to obtain the video streams respectively corresponding to the plurality of views.

In another exemplary embodiment, the determining unit is configured to determine, according to a quantity of cameras, the plurality of views included in the panoramic video stream. The division unit is configured to segment, according to a reverse process of video stream splicing, the panoramic video stream into video streams correspondingly collected by the cameras, to obtain the video streams respectively corresponding to the plurality of views.

In another exemplary embodiment, the distribution module 1130 includes:

an obtaining unit, configured to obtain a plurality of preset stream pushing bit rates, the plurality of stream pushing bit rates corresponding to the plurality of bit rate versions; a coding unit, configured to encode the video streams of the plurality of views into video coding blocks corresponding to the plurality of stream pushing bit rates; and a stream pushing unit, configured to push, to each streaming media server, a video coding block corresponding to at least one stream pushing bit rate in at least one view.

In another exemplary embodiment, the stream pushing unit is configured to determine at least one view corresponding to each streaming media server; and push video coding blocks corresponding to a plurality of stream pushing bit rates in corresponding views to streaming media servers.

In another exemplary embodiment, the stream pushing unit is configured to determine at least one stream pushing bit rate corresponding to each streaming media server; and push video coding blocks corresponding to a plurality of views of corresponding stream pushing bit rates to streaming media servers.

In another exemplary embodiment, the video stream transmission control apparatus further includes a synchronization start module, configured to start a data packet clock synchronization service, to maintain data packet clock synchronization between the stream pushing terminal, the plurality of streaming media servers, and the stream pulling terminal.

Figure 12:
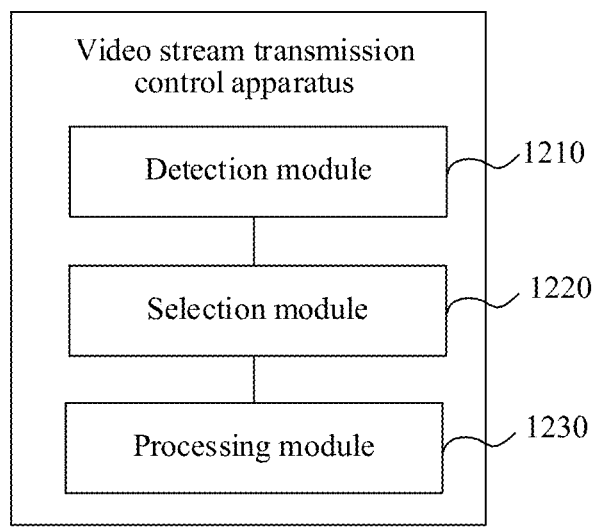
FIG. 12 is a block diagram of a video stream transmission control apparatus according to another exemplary embodiment of this disclosure.

FIG. 12 is a block diagram of a video stream transmission control apparatus according to another exemplary embodiment of this disclosure. The apparatus is applied to the implementation environment shown in FIG. 1, and is specifically configured on the stream pulling terminal 130 in the implementation environment shown in FIG. 1. The apparatus is also applied to the video stream transmission control system shown in FIG. 9, and is specifically configured on the stream pulling terminal 930 in the video stream transmission control system shown in FIG. 9.

As shown in FIG. 12, the exemplary video stream transmission control apparatus includes:

a detection module 1210, configured to receive a video stream transmitted by a streaming media server, and detect network indicator information of the video stream during a receiving process; a selection module 1220, configured to predict a network status of the stream pulling terminal based on the network indicator information, and obtain a target bit rate version that matches the network status; and a processing module 1230, configured to determine a target view according to required view information, and generate a stream pulling request based on the target bit rate version and the target view, the stream pulling request being configured for indicating to pull, from a target streaming media server, a video stream of the target bit rate version corresponding to the target view.

In another exemplary embodiment, the selection module 1220 includes:

a determining unit, configured to determine, according to the network indicator information, quality of a network environment in which the stream pulling terminal is located; and a selection unit, configured to determine a bit rate version that matches the quality of the network environment, and the quality of the network environment being in a positive correlation with the bit rate version.

In another exemplary embodiment, the streaming media server transmits a video stream to the stream pulling terminal by using a stream pulling server. The video stream transmission control apparatus further includes:

a transmission module, configured to transmit the stream pulling request to the stream pulling server, to enable the stream pulling server to pull the video stream of the target bit rate version corresponding to the target view from the target streaming media server; and a receiving module, configured to receive a video stream returned by the stream pulling server for the stream pulling request.

The video stream transmission control apparatus provided in the foregoing embodiment and the video stream transmission control method provided in the foregoing embodiment belong to the same concept. Specific manners in which each module and unit performs operations are described in detail in the method embodiments. In actual application of the video stream transmission control apparatus provided in the foregoing embodiment, the foregoing functions may be allocated to and completed by different functional modules according to requirements. In other words, an internal structure of the apparatus is divided into different functional modules to complete the entire or a part of the functions described above. This is also not limited herein.

In the video stream transmission control apparatus provided in the foregoing embodiment of this disclosure, a stream pushing terminal generates, based on a panoramic video stream, video streams respectively corresponding to a plurality of views, encodes the video streams corresponding to the plurality of views into video streams of a plurality of bit rate versions, and distributes, to a plurality of streaming media servers, the video streams of the plurality of bit rate versions respectively corresponding to the plurality of views. A stream pulling terminal determines a matched target bit rate version based on a predicted network status, determines a target view according to required view information, and pulls, from a target streaming media server, a video stream of the target bit rate version corresponding to the target view. In this way, in a panoramic video stream transmission scenario, a process of bit stream selection for different views can adapt to a network change during video stream transmission, thereby achieving proper control of the video stream transmission.

An embodiment of this disclosure further provides an electronic device, including: one or more processors; and a memory, configured to store one or more programs, the one or more programs, when executed by the one or more processors, enabling the electronic device to implement the video stream transmission control methods provided in the foregoing embodiments.

Figure 13:
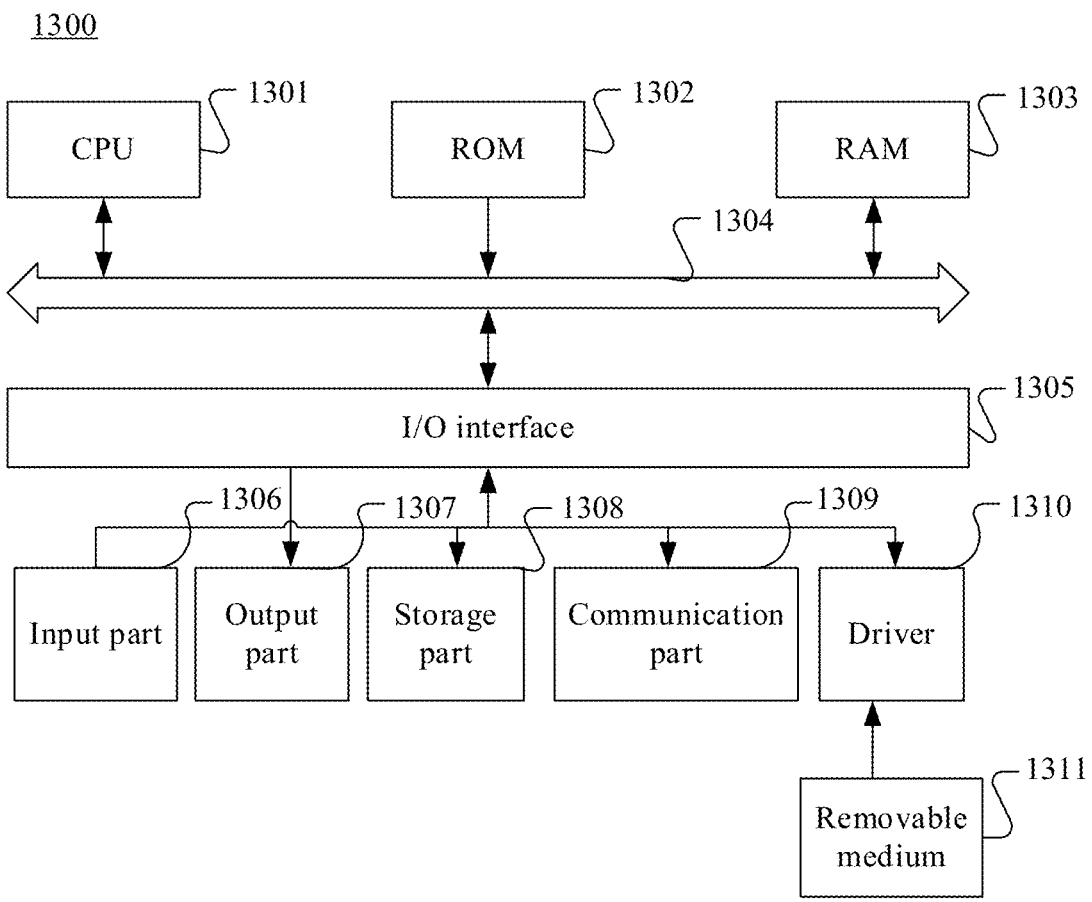
FIG. 13 is a schematic diagram of a structure of a computer system of an electronic device for implementing an embodiment of this disclosure.

FIG. 13 is a schematic diagram of a structure of a computer system of an electronic device for implementing an embodiment of this disclosure. The computer system 1300 of the electronic device shown in FIG. 13 is merely an example, and may not bring any limitation to the function and use ranges of this embodiment of this disclosure.

As shown in FIG. 13, the computer system 1300 includes a central processing unit (CPU) 1301, which may perform various suitable actions and processing based on a program stored in a read-only memory (ROM) 1302 or a program loaded from a storage part 1308 into a random access memory (RAM) 1303, for example, perform the method described in the foregoing embodiment. The RAM 1303 further has various programs and data required for system operations store therein. The CPU 1301, the ROM 1302, and the RAM 1303 are connected to each other through a bus 1304. An input/output (I/O) interface 1305 is also connected to the bus 1304.

The following components are connected to the I/O interface 1305: an input part 1306 including a keyboard, a mouth, and the like; an output part 1307 including, for example, a cathode ray tube (CRT), a liquid crystal display (LCD), and a speaker; a storage part 1308 including a hard disk, and the like; and a communication part 1309 including, for example, a local area network (LAN) card, a modem, and another network interface card. The communication part 1309 performs communication processing by using a network such as the Internet. A driver 1310 is also connected to the I/O interface 1305 according to a requirement. A removable medium 1311, such as a magnetic disk, an optical disc, a magneto-optical disk, or a semiconductor memory, is mounted on the driver 1310 according to a requirement, so that a computer program read from the removable medium 1311 is installed into the storage part 1308 according to a requirement.

Particularly, according to this embodiment of this disclosure, the processes described above with reference to the flowcharts may be implemented as computer software programs. For example, this embodiment of this disclosure includes a computer program product. The computer program product includes a computer program carried on a computer-readable medium. The computer program includes a computer program configured for performing the method shown in the flowchart. In such an embodiment, the computer program may be downloaded and installed from the network by using the communication part 1309 and/or may be installed from the removable medium 1311. When the computer program is executed by the central processing unit (CPU) 1301, the various functions defined in the system of this disclosure are performed.

The computer-readable medium shown in this embodiment of this disclosure may be a computer-readable signal medium, or a computer-readable storage medium, or any combination thereof. The computer-readable storage medium may be, for example, an electric, magnetic, optical, electromagnetic, infrared, or semi-conductive system, apparatus, or component, or any combination of the above. A more specific example of the computer-readable storage medium may include but is not limited to: an electrical connection with one or more wires, a portable computer disk, a hard disk, a random access memory (RAM), a read-only memory (ROM), an erasable programmable read only memory (EPROM), a flash memory, an optical fiber, a portable compact disc read-only memory (CD-ROM), an optical storage device, a magnetic storage device, or any appropriate combination thereof. In this disclosure, the computer-readable signal medium may include a data signal transmitted in a baseband or as part of a carrier, and a computer-readable computer program is carried thereon. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included on the computer-readable medium may be transmitted by any appropriate medium, including, but not limited to: wireless, wired, and the like, or any appropriate combination thereof.

The flowcharts and block diagrams in the accompanying drawings illustrate possible system architectures, functions and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions configured for implementing specified logic functions. In some alternative implementations, the functions labeled in the box may alternatively occur in a sequence different from those labeled in the accompanying drawings. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this disclosure may be implemented in a software manner, or may be implemented in a hardware manner, and the unit described can also be set in a processor. Names of the units do not constitute a limitation on the units in a specific case.

According to another aspect of this disclosure, a computer-readable storage medium is provided, having a computer program stored thereon, the computer program, when executed by a processor, implementing the foregoing video stream transmission control method. The computer-readable storage medium may be included in the electronic device described in the foregoing embodiment, or may exist alone and is not disposed in the electronic device.

According to another aspect of this disclosure, a computer program product or a computer program is further provided, including computer instructions stored on a computer-readable storage medium. A processor of a computer device reads the computer instructions from the computer-readable storage medium, and the processor executes the computer instructions, so that the computer device performs the video stream transmission control method provided in the foregoing various embodiments.

The foregoing descriptions are merely exemplary embodiments of this disclosure, and are not intended to limit embodiments of this disclosure. A person of ordinary skill in the art can make corresponding modifications and variations with ease without departing from the spirit and scope of embodiments of this disclosure. Therefore, the protection scope of this disclosure shall be subject to the protection scope of the claims.

In addition, in the specific implementation of this disclosure, related data such as view information, network indicator information, and a bit rate version is involved. When the foregoing embodiments of this disclosure are applied to a specific product or technology, a permission or consent of a user is required, and collection, use, and processing of the related data need to comply with relevant laws, regulations, and standards of relevant countries and regions.

What is claimed is:

1. A video stream transmission control method, applied to a stream pushing terminal, the method comprising:
   obtaining a panoramic video stream;
   generating, based on the panoramic video stream, video streams respectively corresponding to a plurality of views;
   encoding the video streams corresponding to the plurality of views into video streams of a plurality of bit rate versions; and
   distributing, to a plurality of streaming media servers, the video streams of the plurality of bit rate versions respectively corresponding to the plurality of views, to enable a stream pulling terminal to pull, based on a target bit rate version and a target view, a video stream of the target bit rate version corresponding to the target view from a target streaming media server, the target bit rate version being a bit rate version among the plurality of bit rate versions that matches a predicted network status, and the target view being determined according to required view information.

2. The method according to claim 1, wherein the generating the video streams respectively corresponding to a plurality of views comprises:
   determining a plurality of views comprised in the panoramic video stream; and
   segmenting the panoramic video stream into the video streams respectively corresponding to the plurality of views.

3. The method according to claim 2, wherein the determining the plurality of views comprised in the panoramic video stream comprises:
   performing planar mapping on the panoramic video stream to obtain a plurality of geometric faces, and determining, based on the plurality of geometric faces, the plurality of views comprised in the panoramic video stream; and
   the segmenting the panoramic video stream into the video streams respectively corresponding to the plurality of views comprises:
   segmenting the panoramic video stream based on the plurality of determined views, to obtain the video streams respectively corresponding to the plurality of views.

4. The method according to claim 2, wherein the determining the plurality of views comprised in the panoramic video stream comprises:
   determining, according to a quantity of cameras, the plurality of views comprised in the panoramic video stream; and
   the segmenting the panoramic video stream into the video streams respectively corresponding to the plurality of views comprises:
   segmenting, according to a reverse process of video stream splicing, the panoramic video stream into video streams correspondingly collected by the cameras, to obtain the video streams respectively corresponding to the plurality of views.

5. The method according to claim 1, wherein the encoding the video streams corresponding to the plurality of views into video streams of a plurality of bit rate versions, and distributing, to a plurality of streaming media servers, the video streams of the plurality of bit rate versions respectively corresponding to the plurality of views comprises:
   obtaining a plurality of preset stream pushing bit rates, the plurality of stream pushing bit rates corresponding to the plurality of bit rate versions;
   encoding the video streams of the plurality of views into video coding blocks respectively corresponding to the plurality of stream pushing bit rates; and
   pushing, to each streaming media server, a video coding block corresponding to at least one stream pushing bit rate in at least one view.

6. The method according to claim 1, wherein the method further comprises:
   starting a data packet clock synchronization service, to maintain data packet clock synchronization between the stream pushing terminal, the plurality of streaming media servers, and the stream pulling terminal.

7. A video stream transmission control apparatus for a stream pushing terminal, comprising:
   a memory operable to store computer-readable instructions; and a processor circuitry operable to read the computer-readable instructions, the processor circuitry when executing the computer-readable instructions is configured to:
obtain a panoramic video stream;
generate, based on the panoramic video stream, video streams respectively corresponding to a plurality of views;
encode the video streams corresponding to the plurality of views into video streams of a plurality of bit rate versions; and
distribute, to a plurality of streaming media servers, the video streams of the plurality of bit rate versions respectively corresponding to the plurality of views, to enable a stream pulling terminal to pull, based on a target bit rate version and a target view, a video stream of the target bit rate version corresponding to the target view from a target streaming media server, the target bit rate version being a bit rate version among the plurality of bit rate versions that matches a predicted network status, and the target view being determined according to required view information.

8. The apparatus according to claim 7, wherein the processor circuitry is configured to:
determine a plurality of views comprised in the panoramic video stream; and
segment the panoramic video stream into the video streams respectively corresponding to the plurality of views.

9. The apparatus according to claim 8, wherein the processor circuitry is configured to:
perform planar mapping on the panoramic video stream to obtain a plurality of geometric faces, and determine, based on the plurality of geometric faces, the plurality of views comprised in the panoramic video stream; and
segment the panoramic video stream based on the plurality of determined views, to obtain the video streams respectively corresponding to the plurality of views.

10. The apparatus according to claim 8, wherein the processor circuitry is configured to:
determine, according to a quantity of cameras, the plurality of views comprised in the panoramic video stream; and
segment, according to a reverse process of video stream splicing, the panoramic video stream into video streams correspondingly collected by the cameras, to obtain the video streams respectively corresponding to the plurality of views.

11. The apparatus according to claim 7, wherein the processor circuitry is configured to:
obtain a plurality of preset stream pushing bit rates, the plurality of stream pushing bit rates corresponding to the plurality of bit rate versions;
encode the video streams of the plurality of views into video coding blocks respectively corresponding to the plurality of stream pushing bit rates; and
push, to each streaming media server, a video coding block corresponding to at least one stream pushing bit rate in at least one view.

12. The apparatus according to claim 7, wherein the processor circuitry is further configured to:
start a data packet clock synchronization service, to maintain data packet clock synchronization between the stream pushing terminal, the plurality of streaming media servers, and the stream pulling terminal.

13. A non-transitory machine-readable media, having instructions stored on the machine-readable media, the instructions configured to, when executed, cause a machine to:
obtain a panoramic video stream;
generate, based on the panoramic video stream, video streams respectively corresponding to a plurality of views;
encode the video streams corresponding to the plurality of views into video streams of a plurality of bit rate versions; and
distribute, to a plurality of streaming media servers, the video streams of the plurality of bit rate versions respectively corresponding to the plurality of views, to enable a stream pulling terminal to pull, based on a target bit rate version and a target view, a video stream of the target bit rate version corresponding to the target view from a target streaming media server, the target bit rate version being a bit rate version among the plurality of bit rate versions that matches a predicted network status, and the target view being determined according to required view information.

14. The non-transitory machine-readable media according to claim 13, wherein the instructions are configured to cause the machine to:
determine a plurality of views comprised in the panoramic video stream; and
segment the panoramic video stream into the video streams respectively corresponding to the plurality of views.

15. The non-transitory machine-readable media according to claim 14, wherein the instructions are configured to cause the machine to:
perform planar mapping on the panoramic video stream to obtain a plurality of geometric faces, and determine, based on the plurality of geometric faces, the plurality of views comprised in the panoramic video stream; and
segment the panoramic video stream based on the plurality of determined views, to obtain the video streams respectively corresponding to the plurality of views.

16. The non-transitory machine-readable media according to claim 14, wherein the instructions are configured to cause the machine to:
determine, according to a quantity of cameras, the plurality of views comprised in the panoramic video stream; and
segment, according to a reverse process of video stream splicing, the panoramic video stream into video streams correspondingly collected by the cameras, to obtain the video streams respectively corresponding to the plurality of views.

17. The non-transitory machine-readable media according to claim 13, wherein the instructions are configured to cause the machine to:
obtain a plurality of preset stream pushing bit rates, the plurality of stream pushing bit rates corresponding to the plurality of bit rate versions;
encode the video streams of the plurality of views into video coding blocks respectively corresponding to the plurality of stream pushing bit rates; and
push, to each streaming media server, a video coding block corresponding to at least one stream pushing bit rate in at least one view.

18. The non-transitory machine-readable media according to claim 13, wherein the instructions are further configured to cause the machine to:

start a data packet clock synchronization service, to maintain data packet clock synchronization between the stream pushing terminal, the plurality of streaming media servers, and the stream pulling terminal.

* * * * *